UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

WASTE-SULFITE-LIQUOR DISINFECTANT.

No. 877,414.  Specification of Letters Patent.  Patented Jan. 21, 1908.

Application filed September 9, 1907. Serial No. 391,887.

*To all whom it may concern:*

Be it known that I, CARLETON ELLIS, a citizen of the United States, and a resident of Larchmont, in the county of Westchester and State of New York, have invented certain new and useful Improvements in Waste-Sulfite-Liquor Disinfectants, of which the following is a specification.

This invention relates to antiseptic and disinfecting compositions and has for its object the production of a water-soluble, water-miscible or easily water-emulsifiable preparation containing creosote. To this end I combine the creosote with fairly concentrated waste sulfite cellulose liquor; with which it forms a seemingly homogeneous liquid that has the property of mixing readily with a large amount of water.

In preparing my composition I take waste sulfite liquor and neutralize and concentrate, preferably under diminished pressure, to produce a clear, thick liquid of about 1.3 specific gravity. Coal tar creosote of a specific gravity of about 1.1 and substantially insoluble in water is then beaten into the sulfite liquor in the proportion of one volume of creosote to two volumes of the concentrated sulfite liquor. The resulting mixture does not ordinarily have the opaque, muddy appearance of an emulsion but is rather clear except for the brown coloration imparted by the sulfite liquor. It therefore appears that the creosote combines to some extent at least with some of the bodies present in the sulfite liquor—possibly with the main constituent, calcium lignosulfonate. Similarly wood creosote may be incorporated with concentrated sulfite liquor. With either creosote the proportions may be varied within wide limits, not only as regards the percentage of creosote in the final product but also with reference to the concentration of the waste sulfite liquor.

In using the illustrative formula set forth above I generally prefer to dilute largely with water, say in the proportion of one quart of the composition to five gallons of water. The article or surface to be disinfected is impregnated or washed with the diluted mixture.

The effectiveness of the creosote as a disinfectant is enhanced through its incorporation with said liquor, presumably due to quasi-combination with some of the elements of the liquor thereby permitting of a more intense bactericidal action than normally prevails. Creosotes of various sorts may be used but I prefer to use only those which are substantially free from tar or tarry matter. Other bodies and disinfectants may be added to the composition such for instance as calcium or magnesium chlorid, magnesium acetate, formaldehyde, starch, casein, etc. to give greater body or slower drying properties or special disinfecting action.

What I claim is:—

1. A composition of matter consisting of two parts concentrated waste sulfite cellulose liquor and one part creosote.

2. A composition of matter consisting of concentrated waste sulfite cellulose liquor and coal tar creosote; the liquor being present in substantially greater proportion than the creosote.

3. A disinfecting composition comprising concentrated waste sulfite cellulose liquor and creosote.

4. A disinfecting composition comprising waste sulfite cellulose liquor and creosote; the former present in excess.

5. A disinfecting composition comprising waste sulfite cellulose liquor of about 1.3 specific gravity and creosote of about 1.1 specific gravity, the former present in excess.

Signed at Larchmont in the county of Westchester and State of New York this sixth day of September A. D. 1907.

CARLETON ELLIS.

Witnesses:
NATHANIEL L. FOSTER,
SAMUEL R. BELL.